United States Patent [19]

Cato et al.

[11] Patent Number: 4,758,058
[45] Date of Patent: Jul. 19, 1988

[54] HOLOGRAPHIC DISK SCANNER HAVING SPECIAL POSITION-INDICATING HOLOGRAMS

[75] Inventors: Robert T. Cato; LeRoy D. Dickson; Robert S. Fortenberry, all of Raleigh, N.C.

[73] Assignee: International Business Machines Corporation, Armonk, N.Y.

[21] Appl. No.: 3,014

[22] Filed: Jan. 12, 1987

[51] Int. Cl.$^4$ ............................................. G02B 26/10
[52] U.S. Cl. ................................. 350/3.71; 235/457; 235/466
[58] Field of Search .................. 235/457, 466, 467; 350/3.71

[56] References Cited

U.S. PATENT DOCUMENTS

| | | | |
|---|---|---|---|
| 3,636,317 | 1/1972 | Torrey | 235/466 |
| 4,415,224 | 11/1983 | Dickson | 350/3.71 |
| 4,548,463 | 10/1985 | Cato et al. | 350/3.71 |
| 4,591,242 | 5/1986 | Broockman et al. | 350/3.71 |
| 4,678,263 | 7/1987 | Funato | 350/3.71 |

FOREIGN PATENT DOCUMENTS 61-57921 3/1986 Japan .................. 350/3.71

OTHER PUBLICATIONS

Wolfheimer, "Holographic Disc Test Apparatus," *IBM Technical Disclosure Bulletin*, vol. 25, No. 11B, Apr. 1983, pp. 6280-6281.

Dickson et al, "Holographic Disc," *IBM Technical Disclosure Bulletin*, vol. 27, No. 2, Jul. 1984, p. 959.

Broockman, "Time Multiplexed Two-Beam Scanner," *IBM Technical Disclosure Bulletin*, vol. 24, No. 9, Feb. 1982, pp. 4841-4843.

Primary Examiner—Bruce Y. Arnold
Assistant Examiner—Martin Lerner
Attorney, Agent, or Firm—Gerald R. Woods

[57] ABSTRACT

A holographic scanner includes a rotating glass disk carrying a plurality of scan line generating holograms, a laser light source and means for detecting reflected optical energy. The scanner is improved by adding a plurality of relatively small position-indicating holograms in alternation with the scan line generating holograms. The position-indicating holograms redirect the laser beam along desired paths on the same side of the disk as the laser. The redirected laser beam may be detected by the system photodetector or an auxiliary photodetector to provide signals indicating the current disk position. The position information can be used by a system processor to optimize scanner parameters as a function of the characteristics of the next active scan line generating hologram.

6 Claims, 4 Drawing Sheets

HOLOGRAPHIC DISK SCANNER HAVING SPECIAL POSITION-INDICATING HOLOGRAMS

TECHNICAL FIELD

The present invention relates to optical scanners and more particularly to a holographic disk scanner having position-indicating holograms alternating with scan-line generating holograms.

BACKGROUND OF THE INVENTION

Optical bar code scanners are being used for a number of different purposes. The best known application for such scanners is in check-out operations at supermarkets or other retail stores. In this application, the scanner detects a bar code printed on or attached to a product and uses the decoded information to retrieve the identity and current price of the product from a system memory. The product identity and price are used primarily to prepare customer receipts. The same information may also be used for other purposes. For example, the product identity may be used in an inventory control system to track current stocks of a particular product and to automatically reorder the product when the stock falls below a predetermined level.

Optical bar code scanners are also used in industrial and/or manufacturing environments. One use of a bar code scanner in such environments is to identify incoming or outgoing labeled materials to control the routing of materials through an automated conveyor system. Another use is to track labeled parts or sub-assemblies on an assembly line to assure that the proper parts and sub-assemblies are available when and where they are needed for final assembly of a complex end product, such as an automobile.

Because there are fundamental differences between the requirements of retail and industrial/manufacturing environments, the same type of optical bar code scanner is not necessarily suitable for use in both kinds of environments. In the retail environment, the product carrying the bar code label can usually be brought to the scanner by the check-out stand operator. Therefore, it is not generally considered critical that a retail check-out scanner be capable of reading bar code labels at widely varying distances from the scanner.

In an industrial/manufacturing environment, on the other hand, it is not always possible for a product to be manipulated so as to bring the bar code label within a limited range of distances from a scanner. In such an environment, the item carrying the bar code label may be too heavy or too bulky to allow the item to be repositioned. In some highly automated systems scanners operate in an unattended mode, which means simply that there is no human operator for the scanner. In such systems, an operator is not available to reposition an item for scanning even where it might be physically feasible to do so.

Different techniques have been adopted in attempts to solve problems encountered in reading bar code labels in industrial/manufacturing environments. Where the label can't be brought to the scanner, the simplest approach is to bring the scanner to the label by using a hand-held or portable scanner. One problem with this approach is that a label may not be located in an easily accessible spot on the item being tracked. Another problem is that an operator must always be available to perform what is basically a mechanical function; namely, maneuvering the hand-held scanner into a position in which the label can be read. The presence of an operator adds to the cost of any operation being performed. Even if costs were not a factor, it may not always be possible to use a human operator because the environment in which the operation is being performed is hostile to humans; e.g., conditions of extreme heat or extreme cold or the existence of toxic vapors.

Because hand-held scanners are not well suited for certain industrial/manufacturing applications, attempts have been made to develop fixed position scanners for such applications. Because the distance between the label and the scanner may vary widely, such fixed position scanners must be designed with a large depth of field. The "depth of field" of the scanner is the range of distances over which the scanner can read the smallest bar code label allowed by the standards authority for the particular bar code being read. For example, the Uniform Product Code Council has issued detailed specifications requiring that UPC (Universal Product Code) labels be no smaller than a predetermined minimum size.

Known scanners employ rotating beam deflectors capable of generating multiple scan lines having different focal lengths; that is, focussed at points at different distances from the scanner. Such scanners can provide a set of scan lines (a scan line pattern) that is capable of reading even small labels at varying distances. However, to achieve an acceptable reading performance over a range of distances, it may be necessary to adjust certain parameters of scanner operation as a function of the characteristics of the different scan lines. For example, a label at a considerable distance from a scanner may be read by a scan line having a long focal length. Since the strength of a returned optical signal is inversely proportional to the distance between the label and the scanner, it may be necessary to increase the gain of the scanner circuits when reading such a label.

A number of different approaches have been suggested for deriving information needed to control the operation of a scanner on a per scan line or per facet basis. Japanese patent application No. 57-116558 discloses a holographic scanner having a rotating transparent substrate with transmission holograms on the lower surface. A laser beam directed toward the lower surface of the substrate is deflected by the transmission holograms. While most of the deflected light exits from the top surface of the substrate, a small portion is internally reflected back toward the underside of the disk. The internally reflected light is detected by a photodetector. The photodetector output is compared with a prescribed value to provide a correction signal which is used to provide uniform intensity of the scanning beam.

One drawback to this apparatus is that the auxiliary photodetector must be located along the path of the internally reflected beam, which is fixed by the physical/optical geometry of the scanner. It may be difficult to locate a photodetector within the scanner housing along this fixed path.

Japanese patent application No. 57-109196 discloses an optical scanner which includes an auxiliary photodetector for detecting laser light reflected from the lower surface of a rotating substrate. The detected light is identified as zero-dimensional (or zero order) reflected light. The output of the auxiliary photodetector is used to control a modulator which regulates the intensity of the laser beam impinging on the substrate. Since the path of the zero-order beam is fixed in accordance with well known laws of optics, the auxiliary photodetector must be located along this fixed path. As mentioned above, it may be difficult as a practical matter of scanner design to locate the auxiliary photodetector on the required path.

U.S. Pat. No. 4,548,463 discloses an optical scanner in which an auxiliary photodetector is located on the opposite side of the holographic disk from the laser light source. While most of the light is deflected by transmission holograms on the holographic disk, a portion of the light (the zero-order beam) continues along the original beam path to the auxiliary photodetector. The output of the photodetector can be used to control video amplifier gain or semiconductor laser current to control laser beam output.

Since the path of the transmitted zero-order beam is fixed, the auxiliary photodetector must be located at a point along that path. Because of space constraints, it may be difficult to locate an auxiliary photodetector on the opposite side of the holographic disk from the laser light source.

An IBM Technical Disclosure Bulletin (Vol. 25, No. 3B, Aug. 1982, page 1599) suggests that an auxiliary data track be encoded at the rim of a holographic disk. Optically or magnetically encoded data in this auxiliary data track could be used to set scanner gain, among other things. While the approach suggested in the article would make it possible to vary scanner parameters on a per facet basis, there are drawbacks to the approach. Means must be provided to both record and read the data track. These means represent added cost. Also, it may be difficult to locate the necessary sensor adjacent the periphery of the disk within a scanner housing.

SUMMARY OF THE INVENTION

The present invention overcomes the problems found in the prior art approaches. If an auxiliary photodetector is required at all in the present invention, its location within the scanner housing can be varied with ease. Also, the invention does not require any means for reading auxiliary data tracks.

The invention is employed in an optical scanner of the type having a rotating disk, a plurality of scan line generating holograms supported on the disk, a coherent light beam source and a photosensitive means for detecting optical energy reflected from an object in the path of the beam as it scans along paths determined by the characteristics of the scan line generating holograms. The scanner further includes means for processing signals generated by the photosensitive means.

Such a scanner is improved by adding a plurality of relatively small position-indicating holograms on the rotating disk in alternation with the scan line generating holograms. The position-indicating holograms are capable of redirecting the coherent light beam produced by the source along a desired path on the same side of the disk as the source. A photosensitive means is located on the path for detecting optical energy redirected by the position-indicating holograms. The scanner includes means responsive to the output of this photosensitive means for dynamically altering predetermined parameters of scanner operation.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

TECHNICAL DESCRIPTION

Figure 1:
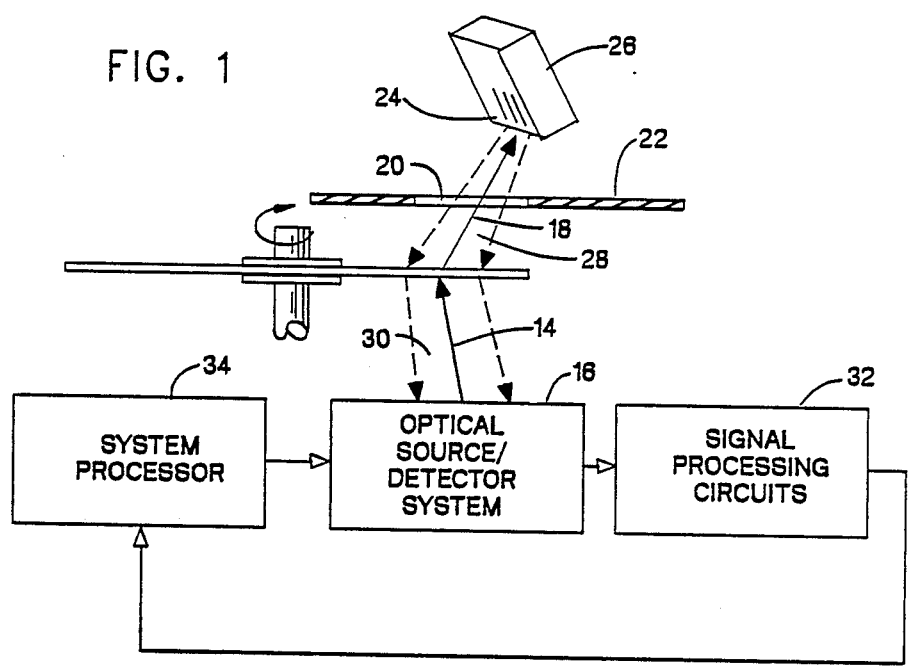
FIG. 1 is a simplified schematic diagram of an optical scanner system including the present invention.

The optical scanner shown in FIG. 1 includes a rotating holographic disk 10 driven at a nominally constant speed by an electric drive motor (not shown) coupled to the hub 12 of the disk. The disk 10 includes a ring of separate scan line generating holograms supported on a transparent substrate. The holograms deflect a laser beam 14 produced by an optical source/detector system 16. The system 16 can include both the laser and conventional optical elements, such as beam expanders, beam collimating lenses, etc.

The movement of the disk 10 relative to the beam 14 produces an outgoing beam 18 which sweeps along an arc determined by the properties of the holographic facet being traversed by the beam 14. The outgoing beam 18 is shown leaving the scanner directly through a transparent window 20 in a scanner top wall 22. In practice, a set of beam-folding mirrors may be located in the path of beam 18 between the disk 10 and the top wall 22. The beam-folding mirrors would redirect the outgoing beam to generate an omni-directional scan pattern capable of reading a bar code label 24 on the product 26 regardless of the orientation of the label 24.

Optical energy reflected from the bar code label 24 (or anything else in the path of the outgoing beam 18) is retro-reflected through the scanner window 20 along a path 28 to the holographic disk 10. The holographic disk 10 deflects the retro-reflected optical energy along path 30 toward an optical detector is applied to signal processing circuits 32. The signal processing circuits 32 may perform conventional thresholding and pulse shaping operations for signals produced by the outgoing beam 18. Output signals from the signal processing circuit 32 are applied to a system processor 34 in which decoding operations may take place. In accordance with the present invention, the system 16 may also produce optical signals indicative of the position of the holographic disk 10. These signals would also be applied through the signal processing circuit 32 to the system processor 34 and can be used by the processor to vary scanner parameters as a function of the current disk position. Since given scan line generating holograms occupy fixed positions on a disk, the disk position also identifies the next scan line generating hologram which will become active. Thus, the scanner parameters will actually be adjusted to optimize scanner performance for the next scan line.

Figure 2:
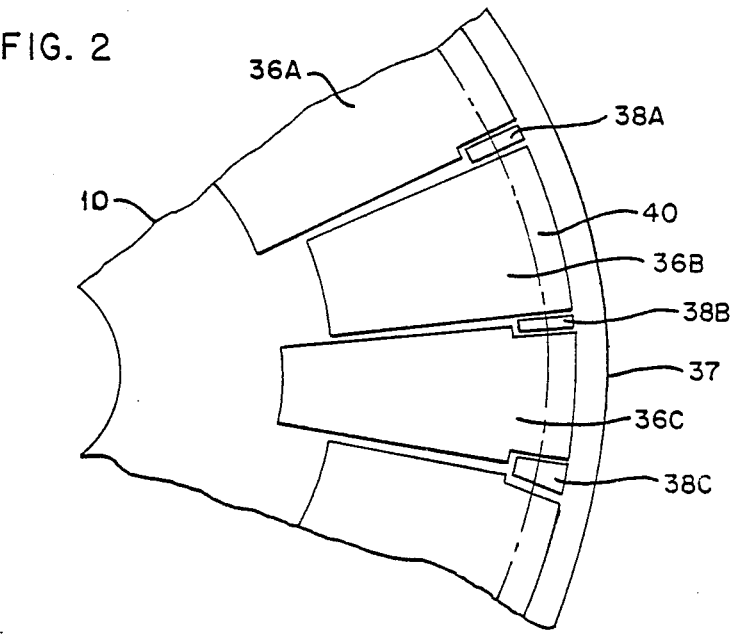
FIG. 2 is a partial plan view of a holographic disk having both scan line generating holograms and position-indicating holograms.

FIG. 2 is a plan view of a portion of disk 10. Disk 10 includes conventional scan line generating holograms 36A, 36B, 36C, etc., arranged in an annular ring on a transparent substrate 37. Unlike conventional holographic disks, however, disk 10 also includes a series of relatively small position-indicating holograms 38A, 38B, 38C which alternate with the scan line generating holograms. The position-indicating holograms are located on the substrate 37 where they will be traversed by the outgoing beam 14 which impinges on the surface of the disk 10 at points along the circular track 40. The function of the position-indicating holograms is to deflect the outgoing beam 14 to a photodetector to provide an optical signal indicating that the beam is striking the disk at a point between the scan line generating holograms.

All of the position-indicating holograms are preferably the same size except one; namely, hologram 38C. As can be seen in the drawing, hologram 38C is larger than the other position-indicating holograms. The signal produced when hologram 38C is traversing the beam 14 is referred to as a Home signal, which provides an indication of an absolute disk position. Signals provided by the other position-indicating holograms increment a facet counter to provide a facet-identifying signal within system processor 34. The Home signal can be used to reset a facet counter contained within system processor 34. The facet identifying signal allows system processor 34 to determine which scan line generating hologram will be the next active hologram and to establish parameters of scanner operation optimized for that hologram. For example, if the next hologram has a relatively long focal length, the system processor 34 increases the gain of the system to amplify signals produced when bar codes are read with scan lines produced by that facet. If the laser included within the optical source/detector system 16 is a semiconductor laser, an output from the system processor 34 may be applied to system 16 to vary the drive current for that laser.

Figure 3:
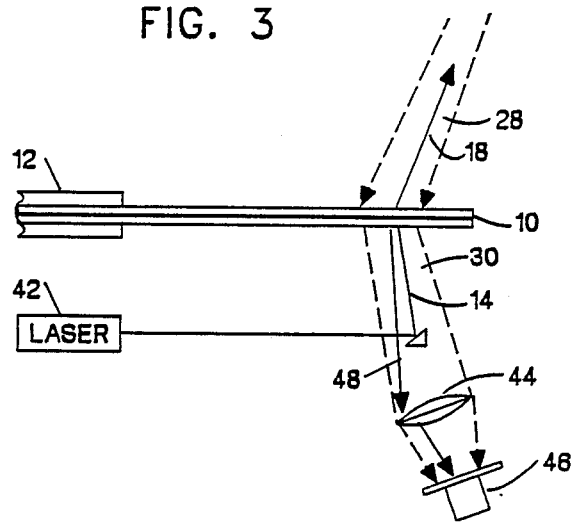
FIG. 3 is a schematic diagram of light beam paths in a first embodiment of the invention.

The position indicating holograms 38A, 38B, 38C, etc., may either be reflection holograms or transmission holograms. FIG. 3 shows the beam paths in a system using position-indicating reflection holograms. The outgoing beam 14 produced by a laser 42 is deflected along path 18 when one of the scan line generating holograms is traversing the beam. The retro-reflected beam 28 is deflected by the scan line generating hologram along path 30 toward a condensing lens 44 and the system photodetector 46. The system photodetector 46 generates electrical signals which vary as a function of the reflectivity of a bar code label or other object in the path of the outgoing beam 18.

When the disk 10 is positioned so that one of the position indicating holograms is traversing the point of intersection of beam 14, the beam may be redirected along a path 48 toward the condensing lens 44. The reflected beam 48 can be detected by the system photodetector 46 to provide a position-indicating electrical signal.

Figure 5:
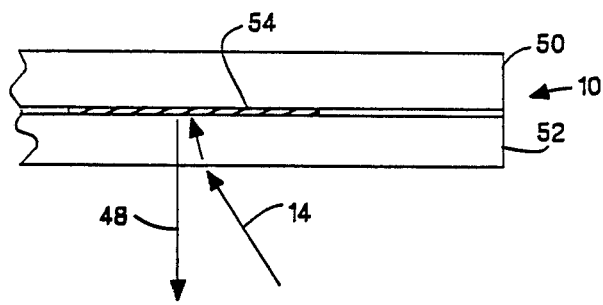
FIG. 5 is a more detailed ray diagram of the light beam paths in the first embodiment of the invention.

FIG. 5 is a more detailed view of portions of the beam paths produced by the system described immediately above. FIG. 5 shows that holographic disk 10 preferably consists of an upper glass disk 50 and a lower glass disk 52 with both the scan line generating holograms and the position-indicating holograms sandwiched between the two glass disks. The laser beam 14 would be refracted slightly at the air/glass interface of the lower disk 52. When the refracted beam strikes a reflective position-indicating hologram 54, that hologram deflects the beam along the path 48 toward the system photodetector.

Figure 4:
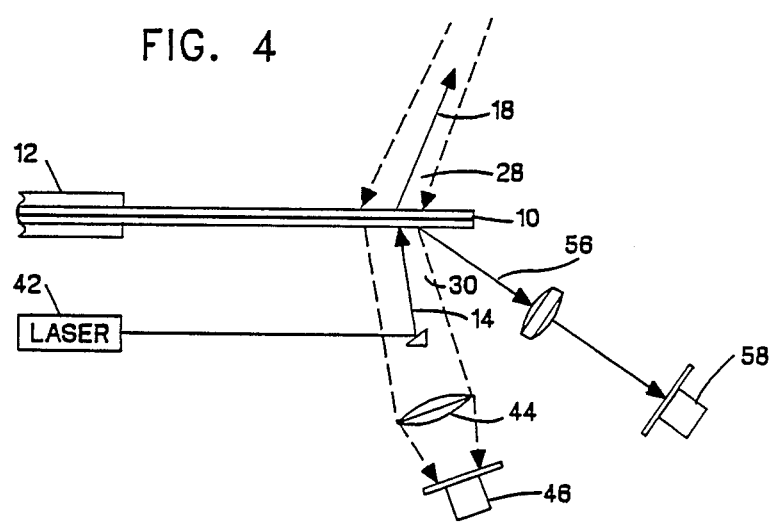
FIG. 4 is a schematic diagram of light beam paths in a second alternate embodiment of the invention.

FIG. 4 depicts a second embodiment. In this embodiment, the position-indicating holograms are transmission holograms which redirect but do not reflect the outgoing laser beam 14. The redirected beam is reflected from the air/glass interface at the top surface of disk 10 along a path 56 leading to an auxiliary photodetector 58. The photodetector 58 is preferably shielded so that it receives little or none of the optical energy in the retro-reflected beam 28 but instead only energy produced when the light beam is redirected by the transmissive position indicating hologram.

Figure 6:
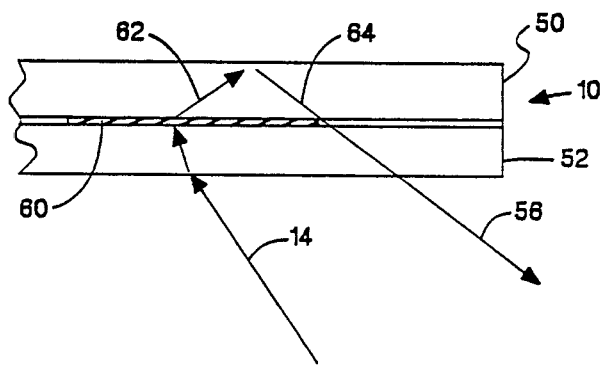
FIG. 6 is a more detailed ray diagram of the light beam paths in the second embodiment of the invention.

FIG. 6 is a more detailed view of portions of the beam paths followed when transmission holograms are used as the position-indicating holograms. The disk 10 has substantially the same physical appearance as for the earlier discussed embodiment. Disk 10 includes the upper glass disk 50, lower glass disk 52 and position-indicating transmission holograms, such as hologram 60. When the outgoing laser beam 14 strikes the transmission hologram 60, a substantial portion of the optical energy in the beam 14 is deflected along a path 62. Part of the light beam following path 62 will exit from the disk 10 at the upper surface, and part will be internally reflected at the air/glass interface along a path 64 which eventually becomes beam path 56 leading to the auxiliary photodetector 58 shown in FIG. 4.

The use of position-indicating holograms in alternation with the scan line generating holograms is advantageous in that the position-indicating holograms can be fabricated using known off-axis techniques to redirect the laser beam along any desired path on the same side of the disk 10 as the laser light source. The ability to redirect the position-indicating beam creates flexibility in the placement of an auxiliary photodetector within the scanner or, as shown above, with reference to FIGS. 3 and 5, even allows the system photodetector to be used to detect position-indicating signals.

Figure 7:
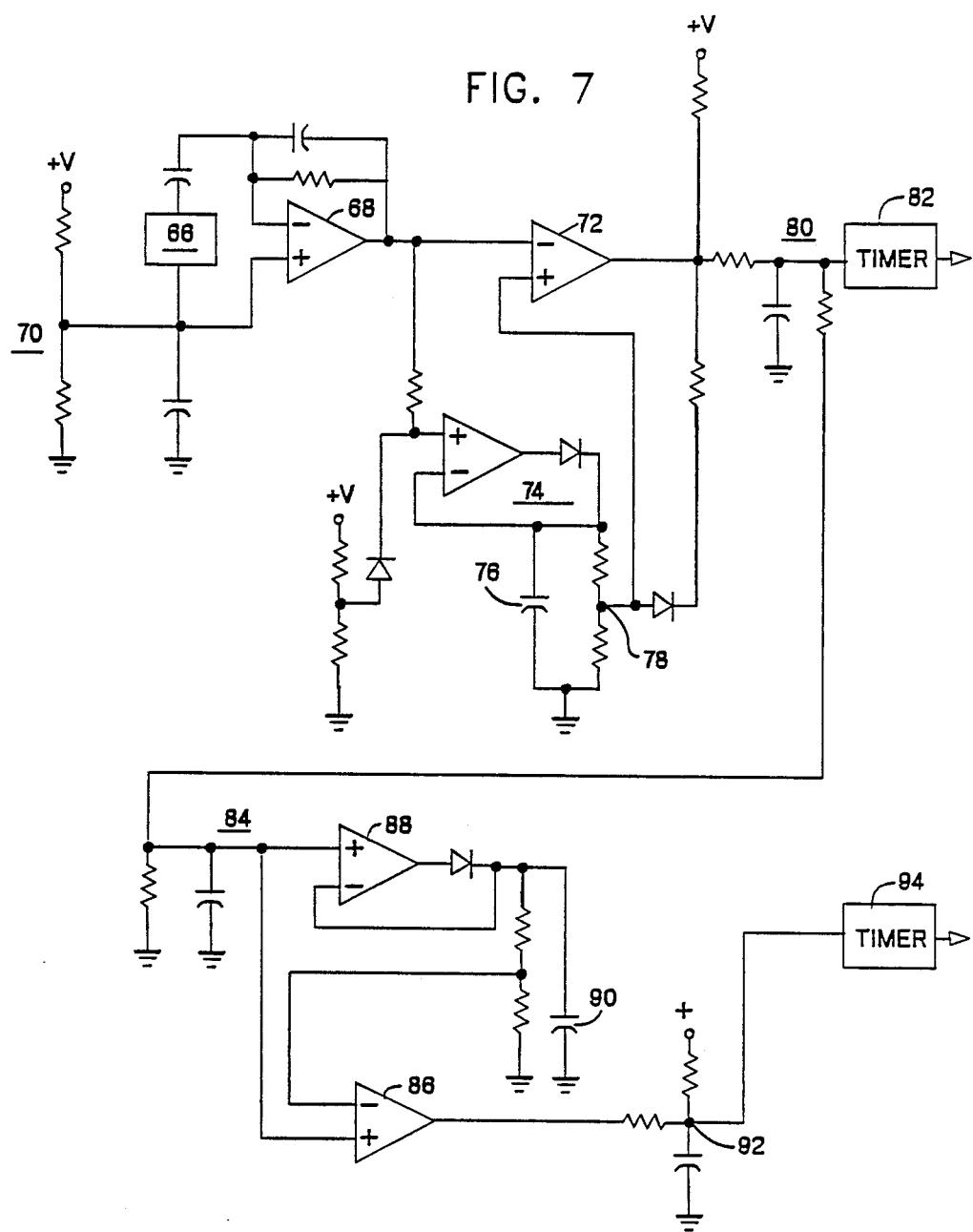
FIG. 7 is a circuit diagram of the components required to generate disk position-indicating pulses.

The circuitry shown in schematic form in FIG. 7 is used to generate position-indicating or edge-of-facet pulses as well as a distinctive Home pulse. For the sake of simplicity, it is assumed that an auxiliary photodetector 66 is employed. The photodetector 66 provides a voltage across the terminals of the comparator amplifier 68. One terminal of the comparator amplifier 68 is biased by means of a voltage divider 70 connecting a reference voltage source to ground. The amplifier 68 inverts and amplifies the photodetector's signal. The output of amplifier 68 is applied to one terminal of a comparator amplifier 72 and to an input of a peak follower circuit 74 which holds the maximum voltage produced by the operational amplifier 68. The amplifier 68 produces the maximum voltage when the position-indicating hologram is aligned with the laser beam. The peak follower circuit 74 includes a follower capacitor 76 and a parallel voltage divider 78 which shifts the voltage stored across capacitor 76 to provide a lower-than-peak value at the second input to comparator amplifier 72. When the input to comparator amplifier 72 from operational amplifier 68 exceeds the input from the voltage divider 78, the output of comparator amplifier 72 is driven to a low value. The output of amplifier 72 is passed through a low pass filter 80 to a timer 82 which provides a uniform width pulse for every position-indicating hologram, including the Home position hologram on the disk.

The output of the low pass filter 80 is also applied to an integrator circuit 84 which charges to a higher voltage during the longer pulse provided only by the Home position-indicating facet. The integrator voltage is fed to a comparator amplifier 86 and to a peak follower circuit 88. The output of the peak follower circuit 88 provides a down-shifted voltage to the second input of the comparator amplifier 86. The down-shifted voltage is proportional to the peak values stored in the follower capacitor 90. The output of comparator amplifier 86 is passed through low pass filter 92 to a timer circuit 94 which produces a "Home" position pulse having a standard length.

While there have been described what are considered to be preferred embodiments of the present invention, variations and modifications will occur to those skilled in the art. Therefore, it is intended that the appended claims shall be construed to include the preferred embodiments and all variations and modifications that fall within the true spirit and scope of the invention.

We claim:

1. For use in an optical scanner of the type having a rotating support member, a plurality of scan line generating holograms carried on the support member, a coherent light beam source, photosensitive means for detecting optical energy reflected from an object in the path of the beam as it scans along paths determined by the characteristics of the scan line generating holograms and means for processing signals generated by the photosensitive means, the improvement which comprises:

a plurality of relatively small position-indicating holograms positioned on the rotating support member in alternation with the scan line generating holograms, said position-indicating holograms being capable of redirecting the coherent light beam produced by the source along a path lying on the same side of the support member as the source;

photosensitive means located on said path for detecting the redirected optical energy; and means responsive to the output of said photosensitive means for dynamically altering predetermined parameters of scanner operation.

2. An improved optical scanner as defined in claim 1 wherein the properties of one of said position-indicating holograms differs from the properties of the others such that optical energy reflected from said one hologram indicates a reference orientation of the support member.

3. An improved optical scanner as defined in claim 2 wherein each of said position-indicating holograms is light transmitting and redirects the coherent light beam produced by the source toward one surface of the rotating support member at an angle of incidence which causes a significant component of the coherent light beam to be reflected from the surface toward the side of the support member on which the source is located.

4. An improved optical scanner as defined in claim 2 wherein each of said position-indicating holograms is light reflecting and redirects the coherent light beam produced by the source toward the side of the support member on which the source is located.

5. An improved optical scanner as defined in either of claims 3 or 4 wherein said photosensitive means comprises a separate component located to receive only the optical energy redirected by said position-indicating holograms.

6. An improved optical scanner as defined in either of claims 3 or 4 wherein said photosensitive means comprises the same component which detects optical energy reflected from objects in the path of a beam produced by one of the scan line generating holograms on the support member.

* * * * *